United States Patent
Cabuz et al.

(10) Patent No.: US 7,445,017 B2
(45) Date of Patent: Nov. 4, 2008

(54) MESOVALVE MODULATOR

(75) Inventors: Eugen I. Cabuz, Eden Prairie, MN (US); Cleopatra Cabuz, Eden Prairie, MN (US); Virgil Claudiu Banu, Ploiesti (RO)

(73) Assignee: Honeywell International Inc., Morristown, NJ (US)

( * ) Notice: Subject to any disclaimer, the term of this patent is extended or adjusted under 35 U.S.C. 154(b) by 569 days.

(21) Appl. No.: 10/905,995

(22) Filed: Jan. 28, 2005

(65) Prior Publication Data

US 2006/0169326 A1    Aug. 3, 2006

(51) Int. Cl.
*G05D 7/06* (2006.01)

(52) U.S. Cl. .................. 137/14; 137/486; 137/487.5; 137/514; 251/129.01; 251/331; 251/335.2

(58) Field of Classification Search ............. 137/14, 137/486, 487.5, 514, 906; 251/50, 118, 129.01, 251/331, 335.2
See application file for complete search history.

(56) References Cited

U.S. PATENT DOCUMENTS

| | | | |
|---|---|---|---|
| 2,403,692 A | 7/1946 | Tibbetts | |
| 2,975,307 A | 3/1961 | Shroeder et al. | |
| 3,304,446 A | 2/1967 | Martinek et al. | |
| 3,381,623 A | 5/1968 | Elliot | |
| 3,414,010 A | 12/1968 | Sparrow | |
| 3,641,373 A | 2/1972 | Elkuch | |
| 3,769,531 A | 10/1973 | Elkuch | |
| 3,803,424 A | 4/1974 | Smiley et al. | |
| 3,947,644 A | 3/1976 | Uchikawa | |
| 3,993,939 A | 11/1976 | Slavin | |
| 4,115,036 A | 9/1978 | Paterson | |
| 4,140,936 A | 2/1979 | Bullock | |

(Continued)

FOREIGN PATENT DOCUMENTS

DE    19617852    1/1993

(Continued)

OTHER PUBLICATIONS

Athavale et al., "Coupled Electrostatics-Structures-Fluidic Simulations of A Bead Mesopump," Proceedings of the International Mechanical Engineers Congress & Exhibition, Nashville, Tennessee, Oct. 1999.

(Continued)

*Primary Examiner*—Ramesh Krishnamurthy
(74) *Attorney, Agent, or Firm*—Kris T. Fredrick

(57) ABSTRACT

A mesovalve having a diaphragm situated between a first chamber and a second chamber. There may be an inlet and an outlet in the first chamber. The diaphragm may provide an orifice between the first and second chambers. There may be a first electrode on the diaphragm and a second electrode on an inside surface of the second chamber. The diaphragm may have first and second positions, or numerous variable positions. Applying a voltage across the electrodes may electrostatically move the diaphragm to the second position during which the outlet is at least partially opened for fluid communication with the inlet, the orifice is closed and the diaphragm is stopped in the second position by a cushioning fluid pressure in the second cavity to prevent pull-in. Removing the voltage from the electrodes may let the diaphragm return to the first position, open the orifice and close the outlet.

38 Claims, 5 Drawing Sheets

U.S. PATENT DOCUMENTS

| | | |
|---|---|---|
| 4,197,737 A | 4/1980 | Pittman |
| 4,360,955 A | 11/1982 | Block |
| 4,418,886 A | 12/1983 | Holzer |
| 4,453,169 A | 6/1984 | Martner |
| 4,478,076 A | 10/1984 | Bohrer |
| 4,478,077 A | 10/1984 | Bohrer |
| 4,498,850 A | 2/1985 | Perlov et al. |
| 4,501,144 A | 2/1985 | Higashi et al. |
| 4,539,575 A | 9/1985 | Nilsson |
| 4,576,050 A | 3/1986 | Lambert |
| 4,581,624 A | 4/1986 | O'Connor |
| 4,585,209 A | 4/1986 | Aine et al. |
| 4,619,438 A | 10/1986 | Coffee |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,821,999 A | 4/1989 | Ohtaka |
| 4,829,826 A | 5/1989 | Valentin et al. |
| 4,898,200 A | 2/1990 | Odajima et al. |
| 4,911,616 A | 3/1990 | Laumann, Jr. |
| 4,938,742 A | 7/1990 | Smits |
| 4,939,405 A | 7/1990 | Okuyama et al. |
| 5,065,978 A | 11/1991 | Albarda et al. |
| 5,069,419 A | 12/1991 | Jerman |
| 5,078,581 A | 1/1992 | Blum et al. |
| 5,082,242 A | 1/1992 | Bonne et al. |
| 5,085,562 A | 2/1992 | van Lintel |
| 5,096,388 A | 3/1992 | Weinberg |
| 5,129,794 A | 7/1992 | Beatty |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,192,197 A | 3/1993 | Culp |
| 5,206,557 A | 4/1993 | Bobbio |
| 5,219,278 A | 6/1993 | van Lintel |
| 5,224,843 A | 7/1993 | van Lintel |
| 5,244,527 A | 9/1993 | Aoyagi |
| 5,244,537 A | 9/1993 | Ohnstein |
| 5,322,258 A | 6/1994 | Bosch et al. |
| 5,323,999 A | 6/1994 | Bonne et al. |
| 5,325,880 A | 7/1994 | Johnson et al. |
| 5,336,062 A | 8/1994 | Richter |
| 5,368,571 A | 11/1994 | Horres, Jr. |
| 5,417,235 A * | 5/1995 | Wise et al. ............. 137/1 |
| 5,441,597 A | 8/1995 | Bonne et al. |
| 5,452,878 A | 9/1995 | Gravesen et al. |
| 5,499,909 A | 3/1996 | Yamada et al. |
| 5,526,172 A | 6/1996 | Kanack |
| 5,529,465 A | 6/1996 | Zengerie et al. |
| 5,536,963 A | 7/1996 | Polla |
| 5,541,465 A | 7/1996 | Higuchi et al. |
| 5,552,654 A | 9/1996 | Konno et al. |
| 5,571,401 A | 11/1996 | Lewis et al. |
| 5,642,015 A | 6/1997 | Whitehead et al. |
| 5,683,159 A | 11/1997 | Johnson |
| 5,696,662 A | 12/1997 | Bauhahn |
| 5,725,363 A | 3/1998 | Bustgens et al. |
| 5,759,014 A | 6/1998 | Van Lintel |
| 5,759,015 A | 6/1998 | Van Lintel et al. |
| 5,792,957 A | 8/1998 | Luder et al. |
| 5,808,205 A | 9/1998 | Romo |
| 5,822,170 A | 10/1998 | Cabuz |
| 5,836,750 A | 11/1998 | Cabuz |
| 5,839,467 A | 11/1998 | Saaski et al. |
| 5,863,708 A | 1/1999 | Zanzucchi et al. |
| 5,901,939 A | 5/1999 | Cabuz et al. |
| 5,911,872 A | 6/1999 | Lewis et al. |
| 5,954,079 A | 9/1999 | Barth et al. |
| 5,971,355 A | 10/1999 | Biegelsen et al. |
| 6,106,245 A | 8/2000 | Cabuz |
| 6,109,889 A | 8/2000 | Zengerie et al. |
| 6,116,863 A | 9/2000 | Ahn et al. |
| 6,122,973 A | 9/2000 | Nomura et al. |
| 6,151,967 A | 11/2000 | McIntosh et al. |
| 6,167,761 B1 | 1/2001 | Hanzawa et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,184,608 B1 | 2/2001 | Cabuz et al. |
| 6,211,580 B1 | 4/2001 | Cabuz et al. |
| 6,215,221 B1 | 4/2001 | Cabuz et al. |
| 6,240,944 B1 | 6/2001 | Ohnstein et al. |
| 6,255,758 B1 | 7/2001 | Cabuz et al. |
| 6,288,472 B1 | 9/2001 | Cabuz et al. |
| 6,358,021 B1 | 3/2002 | Cabuz |
| 6,373,682 B1 | 4/2002 | Goodwin-Johansson |
| 6,382,228 B1 | 5/2002 | Cabuz et al. |
| 6,382,588 B1 | 5/2002 | Hierold |
| 6,418,793 B1 | 7/2002 | Pechoux et al. |
| 6,432,721 B1 | 8/2002 | Zook et al. |
| 6,445,053 B1 | 9/2002 | Cho |
| 6,496,348 B2 | 12/2002 | McIntosh |
| 6,508,528 B2 | 1/2003 | Fuji et al. |
| 6,520,753 B1 | 2/2003 | Grosjean et al. |
| 6,549,275 B1 | 4/2003 | Cabuz et al. |
| 6,568,286 B1 | 5/2003 | Cabuz |
| 6,590,267 B1 | 7/2003 | Goodwin-Johansson et al. |
| 6,597,438 B1 | 7/2003 | Cabuz et al. |
| 6,640,642 B1 | 11/2003 | Onose et al. |
| 6,644,117 B1 | 11/2003 | Kueck et al. |
| 6,649,416 B1 | 11/2003 | Kauer et al. |
| 6,651,506 B2 | 11/2003 | Lee et al. |
| 6,729,856 B2 | 5/2004 | Cabuz et al. |
| 6,750,589 B2 | 6/2004 | Cabuz |
| 6,758,107 B2 | 7/2004 | Cabuz |
| 6,767,190 B2 | 7/2004 | Cabuz et al. |
| 6,837,476 B2 | 1/2005 | Cabuz et al. |
| 2002/0078756 A1 | 6/2002 | Akiyama et al. |
| 2002/0174706 A1 | 11/2002 | Gokhfeld |
| 2002/0192113 A1 | 12/2002 | Uffenheimer et al. |
| 2003/0005774 A1 | 1/2003 | Suzuki et al. |
| 2003/0019299 A1 | 1/2003 | Horie et al. |
| 2003/0033884 A1 | 2/2003 | Beekhuizen et al. |
| 2003/0142291 A1 | 7/2003 | Padmanabhan et al. |
| 2003/0189809 A1 | 10/2003 | Ishikura |
| 2003/0205090 A1 | 11/2003 | Jakobsen |
| 2003/0234376 A1 | 12/2003 | Cabuz et al. |
| 2004/0035211 A1 | 2/2004 | Pinto et al. |
| 2004/0060360 A1 | 4/2004 | Chen |

FOREIGN PATENT DOCUMENTS

| | | |
|---|---|---|
| EP | 0744821 A2 | 11/1996 |
| EP | 0744821 A3 | 12/1996 |
| JP | 05-219760 | 8/1993 |
| JP | 02-86258 | 10/1995 |
| SU | 744877 | 6/1980 |
| WO | WO 97/29538 | 8/1997 |
| WO | WO 00/28215 | 5/2000 |
| WO | WO 01/33078 | 5/2001 |

OTHER PUBLICATIONS

"Large-Scale Linearization Circuit for Electrostatic Motors" IBM Technical Disclosure Bulletin, U.S. IBM Corporation, vol. 37, No. 10, pp. 563-564, Oct. 1, 1994.

B. Halg, "On a Nonvolatile Memory Cell Based on Micro-Electro-Mechanics", Proceedings of MEMS CH2832-4/90/0000-0172 IEEE (1990), pp. 172-176.

Bertz, Schubert, Werner, "Silicon Grooves With Sidewall Angles Down to 1° made By Dry Etching", pp. 331-339.

Branebjerg, Gravesen, "A New Electrostatic Actuator Providing Improved Stroke Length and Force." Micro Elctro Mechanical Systems '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79(2000) pp. 245-250.

C. Cabuz et al., "Mesoscopic Sampler Based on 3D Array of Electrostatically Activated Diaphragms," Proceedings of the 10th Int. Conf. On Solid-State Sensors and Actuators, Transducer'99, Jun. 7-12, 1999, Sendai Japan.

C. Cabuz et al., "The Double Diaphragm Pump," The 14th IEEE International Micro Electro Mechanical Systems conference, MEMS'01, Jan. 21-23, Interlachen, Switzerland.

C. Cabuz, et al., "High Reliability Touch-Mode Electrostatic Actuators", Technical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120, pp. 11864-11873.

Jye-Shane Yang et al., "Porous Shape Persistent Fluorescent Polymer Films: An Approach to TNT Sensory Materials", *J. Am. Chem. Soc.*, 1998, 120, pp. 5321-5322.

Michael S. Freund et al., "A Chemically Diverse Conducting Polymer-Based 'Electronic Nose'", Proceedings of the National Academy of Sciences of the United States of America, vol. 92, No. 7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.

Shikida, Sato, "Characteristics of an Electrostatically-Driven Gas Valve Under High Pressure Conditions, IEEE 1994, pp. 235-240."

Shikida, Sato, Harada, "Fabrication of An S-Shaped Microactuator," Journal of Microelectromechanical Systems, vol. 6, No. 1 (Mar. 1997), pp. 18-24.

Shikida, Sato, Tanaka, Kawamura, Fujisaki, "Electrostatically Driven Gas Valve With High Conductance", Journal of Microelectromechanical Systems, vol. 3, No. 2 (Jun. 1994), pp. 76-80.

Srinivasan et al., "Self-Assembled Fluorocarbon Films for Enhanced Stiction Reduction", Transducers '97, 1997 International Conference on Solid-State Sensors and Actuators, Chicago, Jun. 16-19, 1997, pp. 1399-1402.

Wagner, Quenzer, Hoerscelmann, Lisec, Juerss, "Bistable Microvalve with Pneumatically Coupled Membranes," 0-7803-2985-6/96, IEEE (1996), pp. 384-388.

Bonne et al. "Actuation-Based Fuel Gas Microsensors", IGT Symposium on "Natural Gas Quality, Energy Measurement, Metering and Utilization Practices", Orlando, Fl, 17 pages, Mar. 2001.

Ohnstein et al., "Micromachined Silicon Microvalve", Micro Electromechanical Systems Workshop, Salt Lake City, UT, 4 pages, Feb. 20-22, 1990.

* cited by examiner

MESOVALVE MODULATOR

BACKGROUND

The present invention pertains to valves and particularly to electrostatically actuated valves. More particularly, the invention pertains to electrostatically actuated valves for modulation.

A patent application that may relate to the present invention is U.S. patent application Ser. No. 10/174,851, filed Jun. 19, 2002, which is herein incorporated by reference. Patents that may relate to the present invention include U.S. Pat. Nos. 6,288,472; 6,179,586; 6,106,245; 5,901,939; 5,836,750; and 5,822,170; all of which are herein incorporated by reference. This application may be related to a patent application having Ser. No. 11/025,758, entitled "Electrostatically Actuated Gas Valve" by Bonne et al., and being filed approximately concurrently, and a patent application having Ser. No. 11/018,799, entitled "Media Isolated Electrostatically Actuated Valve" by Cabuz et al., all of which are incorporated herein by reference.

Electrostatic actuators which are voltage driven may be controlled relative to only one-third of the total displacement when a pull-in (viz., snapping) effect occurs. The voltage span for this control may have many times a small value making the valve control a difficult task. In other words, electrostatic actuators may be voltage driven for a limited displacement; however, a pull-in effect may occur after that displacement. There may be many techniques to delay or avoid this phenomenon that makes many electrostatic actuators inappropriate for many applications.

SUMMARY

The invention is a device that may increase the stability for an electrostatically actuated mesovalve structure for use in modulating a flow and/or pressure of a fluid. It may have an air spring that controls the displacement of an electrostatic actuator thereby making it effective for modulator applications. The device may be designed to meet specific application needs by the size of a buffer volume, the diameter of a valve seat and diaphragm pre-stress as design control parameters. The present mesovalve may be a low cost, low power plastic valve made with mesopump technology. The device may use less than one micro joule of power needed for one actuation. The present structure may offer a solution for delaying or avoiding the pull-in effect thereby making the device appropriate for stable applications flow and pressure control and modulation.

DESCRIPTION

In an electrostatic modulator, the electrostatic force may work against a force that keeps two electrodes of the actuator apart. This force may be generated by an elastic, force, a pneumatic force, or the like. By applying a driving voltage, the actuator position may be controlled one third of the initial distance between the electrodes, and the then pull-in (snapping) effect occurs. This control may be done for a certain span of the driving voltage until the pull-in threshold. This threshold value may be small, thus not offering a good resolution for the control driving voltage and making control difficult. If the force that keeps the electrodes apart increases with the displacement of the electrodes, the pull-in effect may occur at one-third of the displacement also but at a higher threshold value. The higher voltage control range may offer a higher resolution for the control of the electrostatic actuator. The present invention may be a mesovalve which avoids the pull-in for a very high control voltage range. The invention may have several applications such as for example a pilot valve for a gas valve for modulation applications. The Figures are not necessarily to scale.

Figure 1:
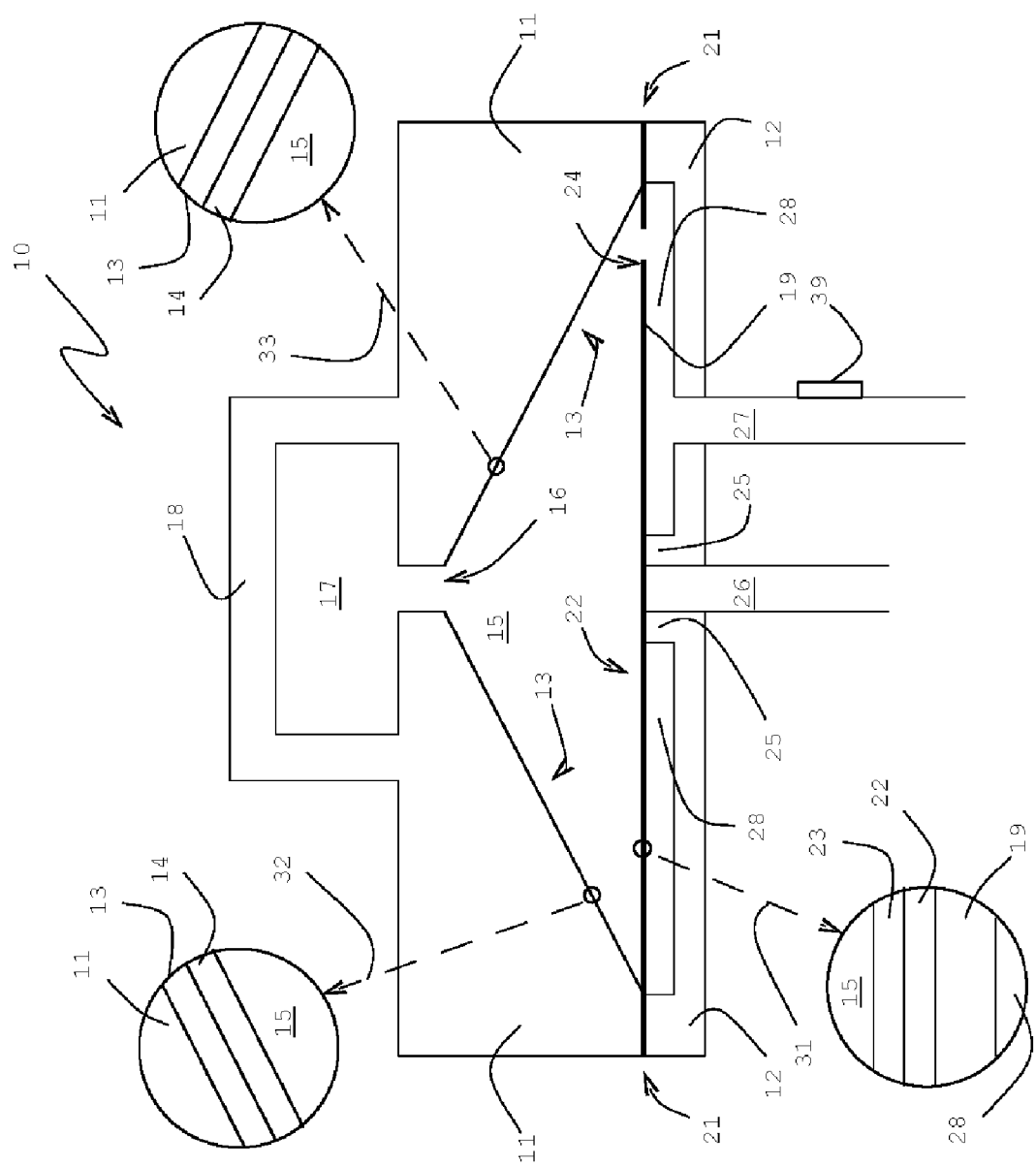
FIGS. 1 and 2 show a mesovalve structure for flow modulation.
Figure 2:
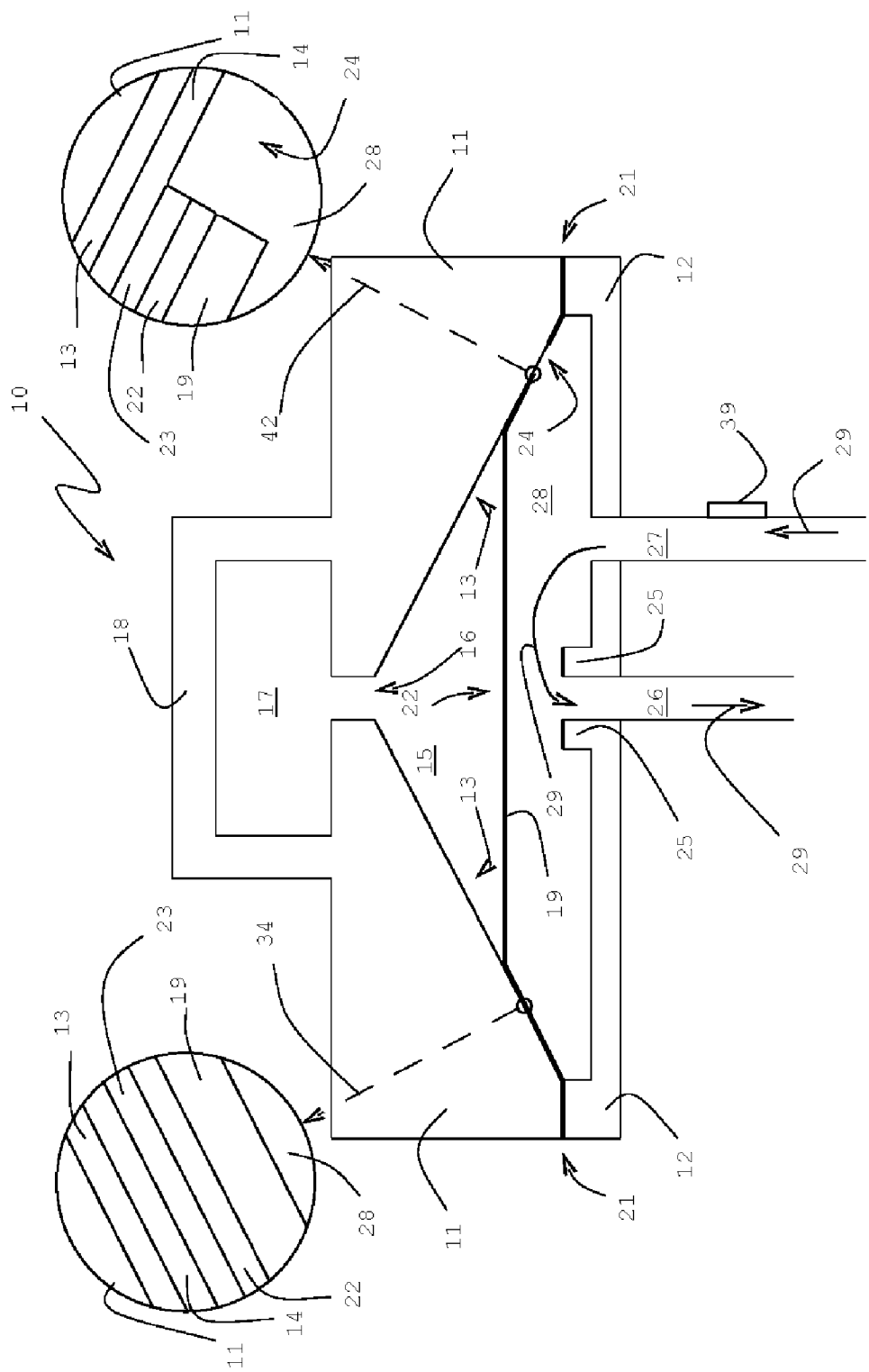

FIGS. 1 and 2 show an illustrative example of a mesovalve 10 that may be applicable for flow modulation control. Mesovalves may be micro-structures. A top part 11 and a bottom part 12 may be plastic molded parts. The parts may also be made from other material with other kinds of fabrication techniques. The top part 11 may have an aluminum (Al) deposition applied to the angled bottom side of the top part to form an electrode 13 with a dielectric 14 formed on the electrode 13. Magnifications 32 and 33 illustrate the layer arrangement incorporating layers 13 and 14 on upper part 11. These magnifications are not necessarily drawn to scale. At the top of a chamber 15 at least partially enclosed by the surface of electrode 13 and dielectric 14 may be an orifice 16 that connected the chamber 15 with a closed buffer volume 17. Volume 17 may be contained by an enclosure 18 which is attached to the upper part 11. Volume 17 may be adjustable.

The top part 11 and the bottom part 12 may be made from any suitable semi-rigid or rigid material, such as plastic, ceramic, silicon, and the like. In one illustrative example, the parts 11 and 12 may be constructed by molding a high temperature plastic such as ULTEM™ (available from the General Electric Company, Pittsfield, Mass.), CELAZOLE™ (available from the Hoechst-Celanese Corporation, Summit, N.J.), KETRON™ (available from the Polymer Corporation, Reading, Pa.), or some other suitable material. In some examples, the material used for a diaphragm 19 may have elastic, resilient, flexible or other elastomeric properties. In other examples, the diaphragm 19 may be made from a generally compliant material which may be elastically deformed and yet return to its original shape or form when the deforming force or forces are removed. In one example, the diaphragm 19 may be made from a polymer such as KAPTON™ (available from E.I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material. An advantage of using a polymer based substrate for a port and/or diaphragm is that the resulting valve may be cheaper and lighter, and/or more suitable for small handheld, or even disposable or reusable applications.

The one or more electrodes 22 of the diaphragm 19 may be provided by patterning a conductive coating on the diaphragm 19. For instance, the one or more electrodes may be formed by printing, plating or an EB deposition of metal. In some cases, the electrode layer may be patterned using a dry film resist. The same or similar techniques may be used to provide the electrode 13 on the inner surface of the upper part 11. Rather than providing a separate electrode layer, it is contemplated that the diaphragm 19 and/or inner surface of the upper part 11 may be made conductive so as to operate as an electrode, if desired. A dielectric, such as a low temperature organic and inorganic dielectric, may be used as an insulator between the actuating electrodes 13 and 22. The dielectric may be coated as a layer 23 over the electrode 22 on the diaphragm 19 and as a layer 14 on the electrode 13 on the inner surface of upper part 11.

The outer circumference of diaphragm 19 may be secured by the connection area 21 of upper part 11 and lower part 12. The diaphragm 19 may span the breadth of the upper 11 and lower 12 parts. Diaphragm 19 may have an aluminum deposition on the top side of the diaphragm which operates as an electrode 22. A deposition of a dielectric 23 may be applied on the electrode 22. Magnification 31 illustrates the layer arrangement relative to diaphragm 19. This magnification is not necessarily drawn to scale. There may be an orifice 24 in the diaphragm 19 close to the edge of the valve chamber 15. The lower side of diaphragm 19 and a seat 25 at the top of port 26 may form a normally closed valve. The valve may be closed in FIG. 1 since the valve is not energized with an electric potential connected to electrodes 13 and 22. When not energized, the diaphragm 19 may be pushing down against the seat 25 and the way from port 27 to port 26 may be closed. The central seat 25 may be slightly higher than the clamping edge of the diaphragm 19. Because of the pre-induced stress, the diaphragm 19 may seal the valve seat 25. The valve may also be regarded as a normally closed valve due to the restoring force of the diaphragm. Further, the diaphragm may be pushed down on the valve seat with an electrostatic repelling force of the electrodes. Also, there may be a tension mechanism, such as a spring, connected to the diaphragm to apply a downward force or an upward force on the diaphragm, as a design may indicate.

By an application of a voltage to the electrode 13 of the top part 11 and the electrode 22 of the diaphragm 19, the diaphragm may move up and the connection between port 27 and port 26 may be at least partially opened, as shown in FIG. 2, permitting a fluid communication between the ports. This movement may be regarded as being caused by an electrostatic attraction or force. The fluid may be a gas or liquid. The diaphragm may be regarded as having a closed position and an open position, or many various open and closed positions.

Magnification 34 illustrates the layer arrangement where a portion of diaphragm 19 is up against upper part 11. Magnification 34 is not necessarily drawn to scale. When the diaphragm moves up, the orifice 24 may come in contact with the chamber 15 wall of the upper part 11. The orifice 24 may become closed as it comes in contact with the dielectric layer 14 on the electrode that is on the inside surface of chamber 15, thereby sealing off the chamber 17 from any volume or ports below the diaphragm 19. The contact of orifice 24 at its edge is shown by a magnification 42 in FIG. 2. This magnification is not necessarily drawn to scale. Under increasing voltage applied to the electrodes 13 and 22, the diaphragm may move up a certain distance but will stop because of the pressure of air or gas that builds up in the closed volumes 15 and 17 above the diaphragm 19. The value of the buffer volume 17 may determine the displacement of the diaphragm before stopping for a certain maximum voltage. The value of the buffer volume 17 may be changed to adjust the displacement of diaphragm 19. The pressure of the volume should stop the diaphragm before the pull-in occurs and the resulting displacement of the diaphragm may be smooth and stable. The fluid (e.g., gas or air) in the volumes 15 and 17 in the top of the diaphragm may work like a variable "air spring". The variation of the pneumatic impedance made by a variable restrictor between the diaphragm 19 and the valve seat 25 may be smooth and stable. For certain in and out pressures P1 and P2 at ports 27 and 26, respectively, where P1>P2, there may be a well-controlled modulation of a flow 29 from port 27 to port 26 via enlarged volume 28. The maximum flow 29 may be adjusted by the size (e.g., diameter) of the valve seat 25.

Figure 5:
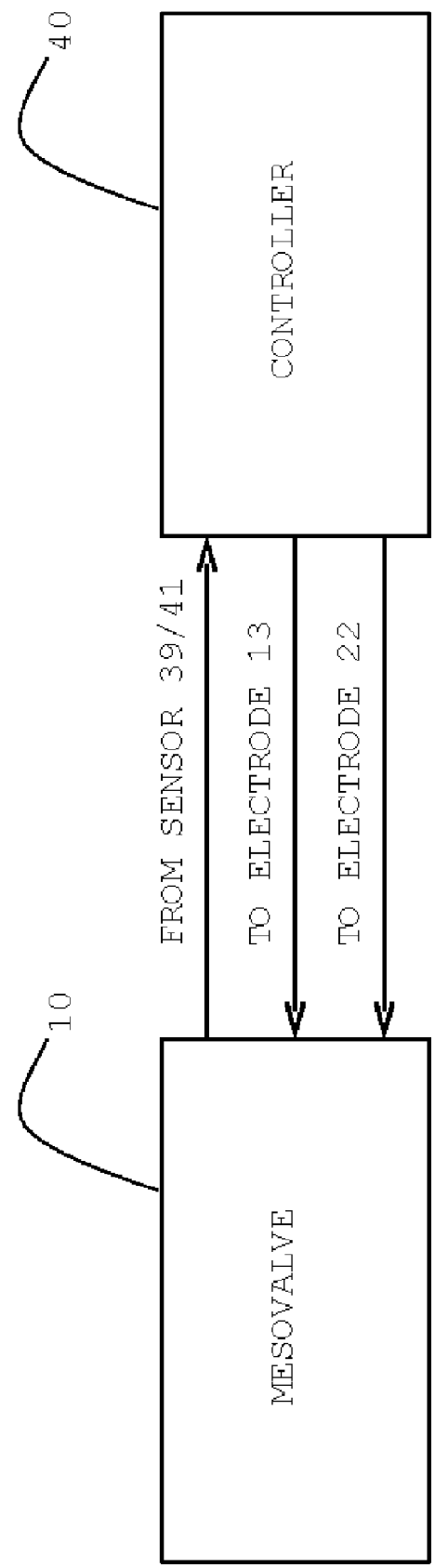
FIG. 5 shows a controller connected to the mesovalve structure.

There may be a flow sensor 39 situated in port 27 and connected to a controller 40. The controller may also be connected to the electrodes 13 and 22. The controller 40 may modulate the flow 29 per a prescribed rate with voltages to the electrodes based on inputs from the sensor 39. FIG. 5 shows controller 41 connected to the mesovalve arrangement 10.

Figure 3:
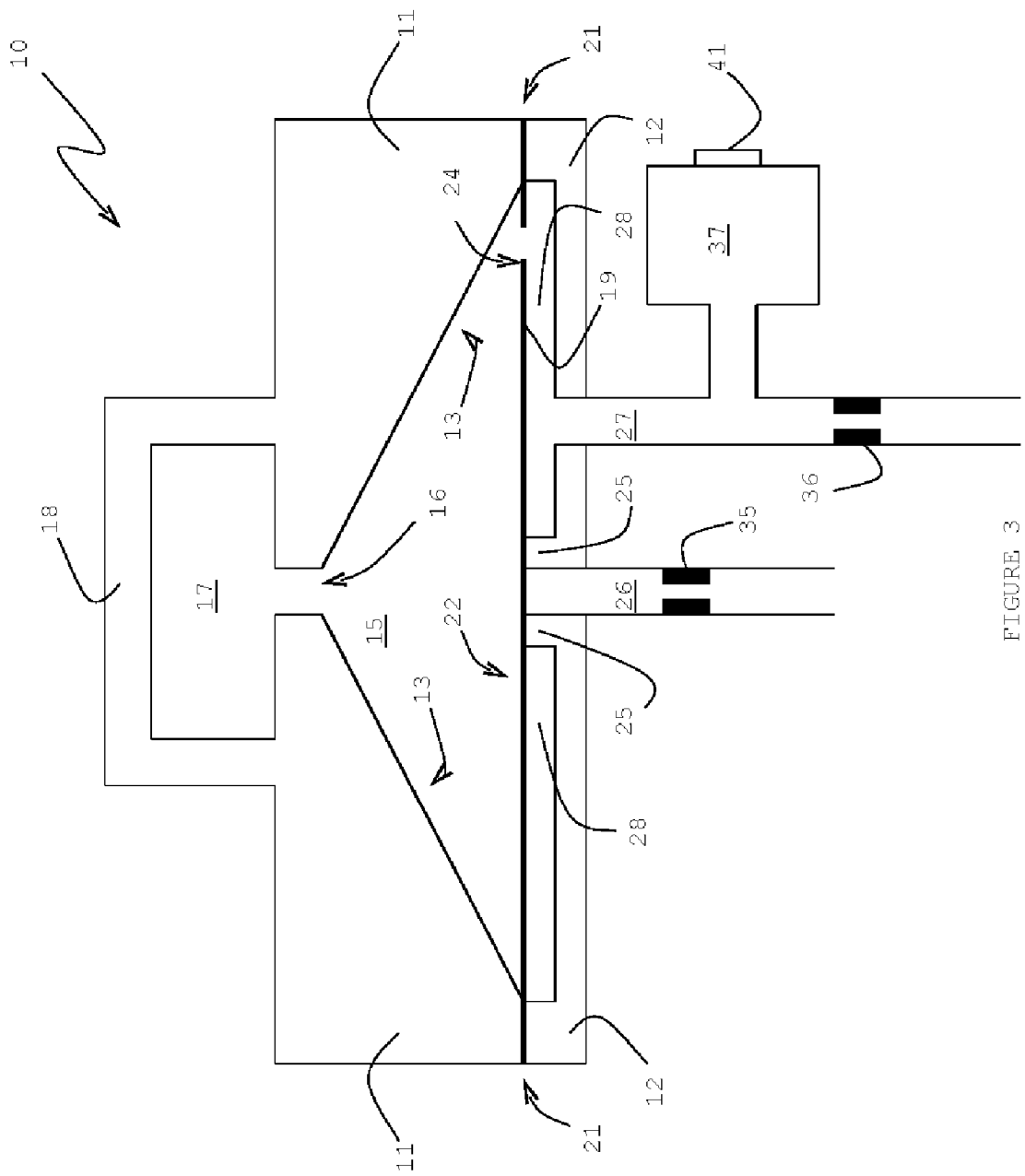
FIGS. 3 and 4 show a mesovalve structure for pressure modulation.
Figure 4:
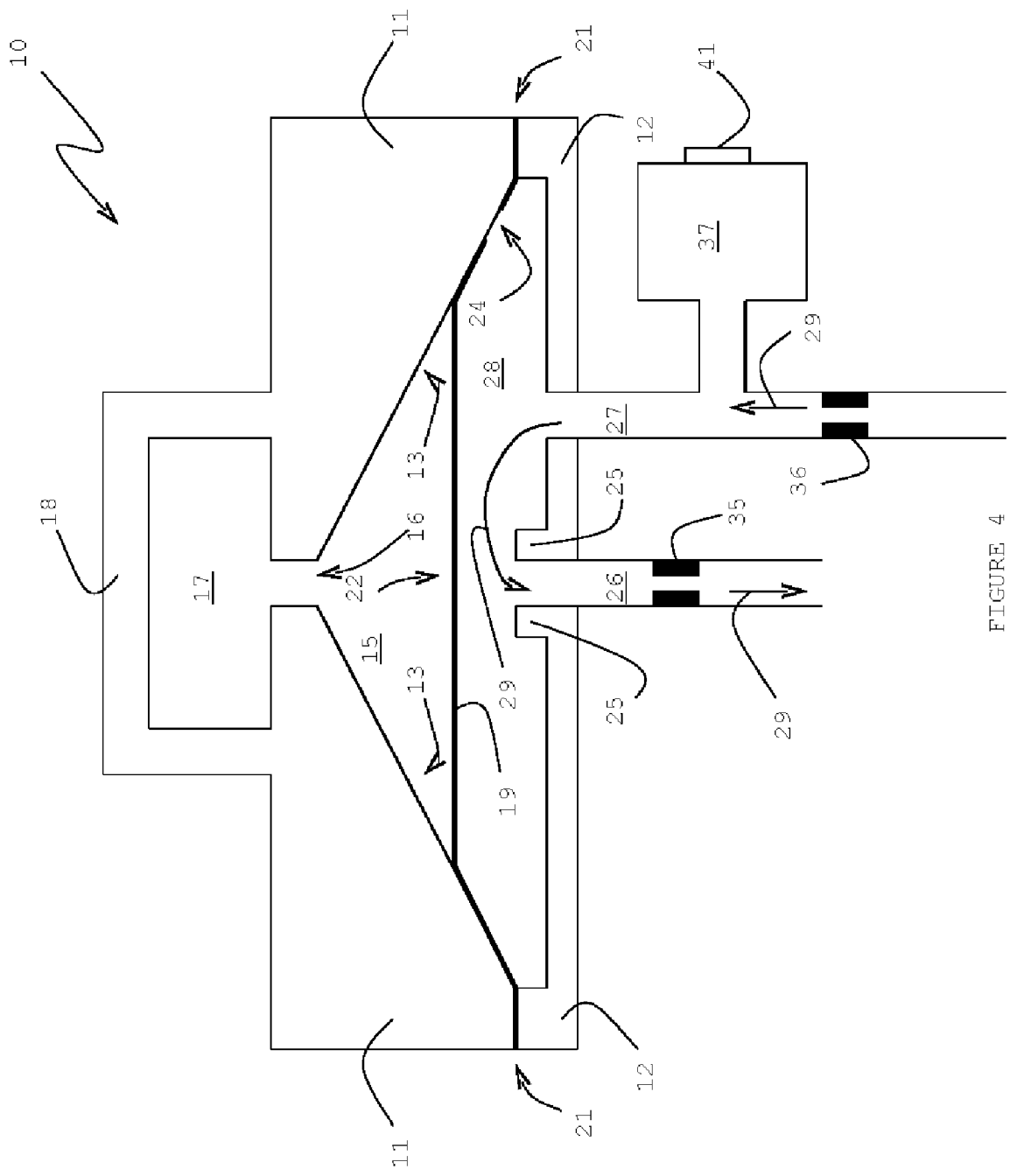

FIGS. 3 and 4 show an illustrative example of a mesovalve 10 that may be applicable for pressure modulation control. The structure of device 10 in these Figures is the same as the device 10 in FIGS. 1 and 2, except for restrictors 35 and 36, and chamber 37 which may be added. The modulated pressure Ps provided the device may be that in the chamber 37. Chamber 37 may be connected to port 27 with the pressure P1 that is to be modulated. At the entrance of port 27 is an input pressure P1 and within that port may be a restrictor 36. The other port 26 may have a restrictor 35 and an output pressure P2 at the exit of the port. The central pole or seat 25 may be slightly higher than the clamping edge of the diaphragm 19 and because the pre-induced stress of the diaphragm may seal the seat 25 of the valve. Application of a voltage across the electrodes 13 and 22 (described above) of the upper part 11and diaphragm 19, respectively, the diaphragm 19 may move up and the connection between port 27 and 26 is opened, permitting fluid communication between the ports. A portion of the diaphragm 19, including the lateral orifice 24, may come in contact with upper part 11. The orifice 24 may be closed and seal off the volume 28 below the diaphragm from the chamber 15 above the diaphragm 19.

Under increasing voltage applied to electrodes 13 and 22, the diaphragm 19 may go a certain distance but will stop because of the pressure that builds up in the diaphragm closed chamber volume 15 and buffer volume 17 which is coupled to volume 15 via the orifice or channel 16. The value or size of the buffer volume 17 may determine the upward movement and displacement of the diaphragm 19 before it stops at a certain place for a certain magnitude of a driving voltage applied to the electrodes 13 and 22. The magnitude of the driving voltage may be set a certain maximum. The buffer volume 17 may be adjustable. The diaphragm 19, along with the pneumatic resistance of the gas being compressed in volumes 15 and 17 and the set voltage, diaphragm 19 may stop before the pull-in occurs. The movement or the dynamic displacement of diaphragm 19 may be smooth and stable. The gas being compressed in volumes 15 and 17 by the upward moving diaphragm may provide some resistance against the top of the diaphragm 19. This resistance against the diaphragm works like a variable "air spring." There may be a variable pneumatic impedance made a variable restrictor which is constituted by the adjustably moving diaphragm and the valve seat 25 situated on the output port 26. This variable pneumatic impedance, together with the restrictors 36 and 35 of ports 27 and 26, respectively, may form a pneumatic pressure divider. For a certain input pressure P1 at the entrance of port 27 and output pressure P2 at the exit of port 26, where P1>P2, one may have a well controlled modulation of the pressure Ps.

There may be a pressure sensor 41 situated in port 27 and connected to a controller 40. The controller may also be connected to the electrodes 13 and 22. The controller 40 may modulate the pressure of the flow 29 per a prescribed pressure with voltages to the electrodes based on inputs from the sensor 41. Programming and/or software may be implemented for control of arrangement or structure 10 by controller 40. FIG. 5 shows controller 40 connected to the mesovalve arrangement 10.

The structure 10 may be easily designed to meet various applications such as, for example, use in a disposable cartridge for a micro-cytometer or other devices. Structure 10 may also be incorporated in MEMS structures, devices and the like.

In the present specification, some of the material may be of a hypothetical nature even though not necessarily indicated as such.

Although the invention is described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. An electrostatic valve comprising:
    a first structure having an inlet and outlet;
    diaphragm situated on the first structure to form a first cavity;
    a second structure situated on an opposite side of the diaphragm from the first structure to form a second cavity, the second cavity having a closed buffer volume;
    a first electrode attached to the diaphragm; and
    a second electrode attached to an inside surface of the second structure; and
    wherein the diaphragm has a closable orifice between the first and second cavities.

2. The valve of claim 1, wherein the diaphragm has a first position and a second position.

3. The valve of claim 2, wherein:
    the outlet is closed when the diaphragm is in the first position;
    the orifice is open when the diaphragm is in the first position;
    the outlet is at least partially open when the diaphragm is in the second position; and
    the orifice is closed when the diaphragm is in the second position.

4. The valve of claim 3, wherein as the diaphragm moves from the first position to the second position the diaphragm is stopped by a pressure of a fluid in the second cavity.

5. The valve of claim 4, wherein the inlet is normally open.

6. The valve of claim 5, wherein:
    applying a voltage across the first and second electrodes may cause the diaphragm to move to the second position; and
    removing the voltage from across the first and second electrodes may cause the diaphragm to move to the first position.

7. The valve of claim 6, further comprising a third cavity coupled to the second cavity.

8. The valve of claim 7, further comprising a sensor proximate to the inlet.

9. The valve of claim 8, further comprising a processor connected to the sensor, and the first and second electrodes.

10. A valve mechanism comprising:
    a body having a diaphragm forming a first chamber and a second chamber; and
    a first port and a second port formed in the first chamber; and
wherein:
    the diaphragm has a first position that restricts fluid from flowing between the first port and the second port, and a second position that allows fluid to flow between the first port and the second port, wherein when the diaphragm is in the second position, the second chamber is closed;
    a first electrode secured to the diaphragm; and
    a second electrode secured in the second chamber to the body.

11. The mechanism of claim 10, wherein the diaphragm is actuated between the first position and the second position when a voltage is applied to the first and second electrodes.

12. The mechanism of claim 11, wherein the diaphragm going toward the second position is increasingly resisted in movement by a compressing of a volume in the second chamber by the diaphragm.

13. The mechanism of claim 12, wherein:
    the diaphragm has an orifice between the first and second chambers;
    the orifice is open when the diaphragm is in the first position; and
    the orifice is closed when the diaphragm is approaching the second position.

14. The mechanism of claim 13, wherein the diaphragm being actuated towards the second position encounters an air spring effect of the second chamber when stopped.

15. The mechanism of claim 14, wherein the input port has a restrictor.

16. The mechanism of claim 15, wherein the output port has a restrictor.

17. The mechanism of claim 14, further comprising:
    a third chamber having a buffer volume connected to the second chamber; and
    wherein the buffer volume is coupled to the volume in the second chamber resulting in a combined volume that is a sum of the buffer volume and the volume in the second chamber.

18. The mechanism of claim 14, further comprising a controller connected to the first and second electrodes.

19. The device of claim 18, further comprising:
    a flow sensor proximate to the input port; and
    wherein the flow sensor is connected to the controller.

20. The device of claim 19, wherein the controller may provide modulation of a flow entering the input port according to a preset flow setting and a flow indication from the flow sensor and the controller may provide an output which determines when and how much voltage is applied to the first and second electrode layers.

21. A valve device comprising:
    a base structure having an input port and an output port;
    a top structure situated on the base structure;
    a diaphragm situated between the top structure and the base structure;
    a first electrode layer formed on an inner surface of the top structure; and
    a second electrode formed on a top surface of the diaphragm; and
wherein:
    the diaphragm has a central portion and an outer circumference;
    the outer circumference is secured between the top structure and the bottom structure;
    a cavity is formed between the inner surface of the top structure and the diaphragm;
    the diaphragm in a first position has the central portion on the bottom structure and the second port is closed;
    the diaphragm in the second position has the central portion away from the bottom structure and the second port is open resulting in a fluid continuity with the first port and the cavity being closed; and a voltage applied to the first and second electrodes may cause the diaphragm to move to the second position.

22. The device of claim 21, wherein the diaphragm in the second position may compress a volume in the cavity.

23. The device of claim 22, wherein the volume in the cavity provides some resistance to the diaphragm moving to the second position.

24. The device of claim 23, wherein the volume prevents the diaphragm from a pull-in between the first and second electrode layers.

25. The device of claim 24, wherein the volume limits the movement of the diaphragm to the second position.

26. The device of claim 25, wherein the diaphragm has an orifice which initially prevents the volume from being a resistance to the diaphragm moving to the second position until the diaphragm has moved a certain distance where a portion of the central portion of the diaphragm containing the orifice contacts a corresponding portion of the inner surface of the top structure and closes the orifice thereby sealing the volume.

27. The device of claim 26, upon removing the voltage from the first and second electrode layers, the diaphragm may move to the first position thereby opening the orifice and closing the second port.

28. The device of claim 27, wherein fluid may flow from the first port into the volume via the orifice when the diaphragm is in the first position.

29. The device of claim 28, wherein a controller may determine when the voltage is to be applied to the first and second electrode layers.

30. The device of claim 29, further comprising:
a enclosure having a buffer volume connected to the top structure; and
wherein the buffer volume is coupled to the volume in the cavity resulting in a combined volume that is a sum of the buffer volume and the volume in the cavity.

31. The device of claim 30, wherein the buffer volume is adjustable.

32. The device of claim 31, further comprising:
a flow sensor proximate to the input port to monitor a flow in the input port; and
wherein the flow sensor is connected to the controller.

33. The device of claim 32, wherein the controller may provide modulation of a flow entering the input port according to a preset flow and a flow indication from the flow sensor with an output which determines when and how much voltage is applied to the first and second electrode layers.

34. The device of claim 31, further comprising:
a pressure sensor proximate to the input port to monitor a pressure in the input port; and
wherein the pressure sensor is connected to the controller.

35. The device of claim 34, wherein the controller may provide modulation of a pressure of a fluid at the input port according to a preset pressure and a pressure indication from the pressure sensor with an output which determines when and how much voltage is applied to the first and second electrode layers.

36. The device of claim 21, wherein:
the base structure is a plastic molded part; and
the top structure is a plastic molded part.

37. The device of claim 36, wherein:
the first electrode layer comprises a metal layer deposited on the inner surface of the top structure; and
the second electrode layer comprises a metal layer deposited on the top surface of the diaphragm.

38. The device of claim 37, wherein:
the first electrode layer further comprises a dielectric layer deposited on the metal layer; and
the second electrode layer further comprises a dielectric layer deposited on the metal layer.

* * * * *